(12) United States Patent
Wilkinson

(10) Patent No.: US 8,454,268 B2
(45) Date of Patent: Jun. 4, 2013

(54) GASEOUS SEQUESTRATION METHODS AND SYSTEMS

(75) Inventor: John R. Wilkinson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 427 days.

(21) Appl. No.: 12/836,236

(22) Filed: Jul. 14, 2010

(65) Prior Publication Data

US 2011/0038670 A1    Feb. 17, 2011

Related U.S. Application Data

(60) Provisional application No. 61/233,034, filed on Aug. 11, 2009.

(51) Int. Cl.
*E02B 1/00* (2006.01)
*E02B 3/00* (2006.01)
*E21B 43/14* (2006.01)
*E21B 47/06* (2012.01)

(52) U.S. Cl.
USPC ............ 405/54; 166/50; 166/52; 166/306; 166/313; 405/59; 405/129.35

(58) Field of Classification Search
None
See application file for complete search history.

(56) References Cited

U.S. PATENT DOCUMENTS

| | | | | |
|---|---|---|---|---|
| 3,152,640 A | * | 10/1964 | Marx | 166/245 |
| 3,175,614 A | * | 3/1965 | Wyllie | 166/250.12 |
| 3,250,326 A | * | 5/1966 | Witherspoon | 166/250.03 |
| 3,318,380 A | * | 5/1967 | Tenny | 166/245 |
| 3,374,633 A | * | 3/1968 | Brandt | 405/58 |
| 6,089,322 A | * | 7/2000 | Kelley et al. | 166/370 |
| 6,457,540 B2 | | 10/2002 | Gardes | |
| 6,745,855 B2 | | 6/2004 | Gardes | |
| 6,923,275 B2 | | 8/2005 | Gardes | |
| 7,185,718 B2 | | 3/2007 | Gardes | |
| 7,243,738 B2 | | 7/2007 | Gardes | |
| 8,256,992 B2 | * | 9/2012 | Dickinson et al. | 405/129.1 |
| 2004/0060705 A1 | | 4/2004 | Kelley | |
| 2004/0200618 A1 | | 10/2004 | Piekenbrock | |

OTHER PUBLICATIONS

Kuuskraa, V. A., et al., (2009) "Using reservoir architecture to maximize $CO_2$ storage capacity", GHGT-9, Energy Procedia 1 3063-3070; and accompanying presentation materials of Nov. 2008.

(Continued)

*Primary Examiner* — George Suchfield
(74) *Attorney, Agent, or Firm* — ExxonMobil Upstream Research Company Law Department

(57) ABSTRACT

Methods and systems for gas sequestration are provided. The systems include a porous storage reservoir containing a dense fluid; a first tubing string, configured to provide and inject a gaseous emissions (GE) stream at or near the top of the porous storage reservoir above the base portion of the porous storage reservoir; and a second tubing string configured to withdraw the dense fluid from the base portion of the porous storage reservoir. In some embodiments, the first and second tubing strings may be encased in a single well bore and may include measurement and control equipment for pressure management of the injection locations. The withdrawn dense fluids may be re-injected into an overlying porous reservoir or may be sent to the surface for treatment. Methods are provided for injection of GE and withdrawal of dense fluids for safe, long term gaseous sequestration of significant portions of carbon dioxide ($CO_2$) and associated gases (gaseous emissions, GE).

15 Claims, 7 Drawing Sheets

OTHER PUBLICATIONS

Leonenko, Y., et al., (2008) "Reservoir Engineering to accelerate the dissolution of CO2 stored in aquifers", Environ. Sci. Technol 42, pp. 2742-2747.

Nghiem, L. et al., (2009), Optimization of Residual Gas and Solubility Trapping for $CO_2$ Storage in Saline Aquifers, Society of Petroleum Engineers, SPE 11980.

Nordbotten, C. et al., (2005) "Injection and Storage of $CO_2$ in Deep Saline Aquifers: Analytical Solution for $CO_2$ plume evolution During Injection" Transp. Porous Med. 58:339-360.

Stauffer, P.H. et al., (2008): "Combining geologic data and numerical modeling to improve estimates of the $CO_2$ sequestration potential of the Rock Springs Uplift, Wyoming", GHGT-9, Washington D.C., Nov. 2008, Energy Procedia 00 (2008) 000-000.

van der Meer, B. (2005), "Carbon Dioxide Storage in Natural Gas Reservoirs", Oil & Gas Science and Technology—Rev IFP, vol. 60, No. 3 pp. 527-536.

Wilkinson, S, et al., (2009) "Subsurface design considerations for carbon dioxide storage", GHGT-9, Energy Procedia I, 3047-3054; and accompanying presentation materials of Nov. 2008.

* cited by examiner

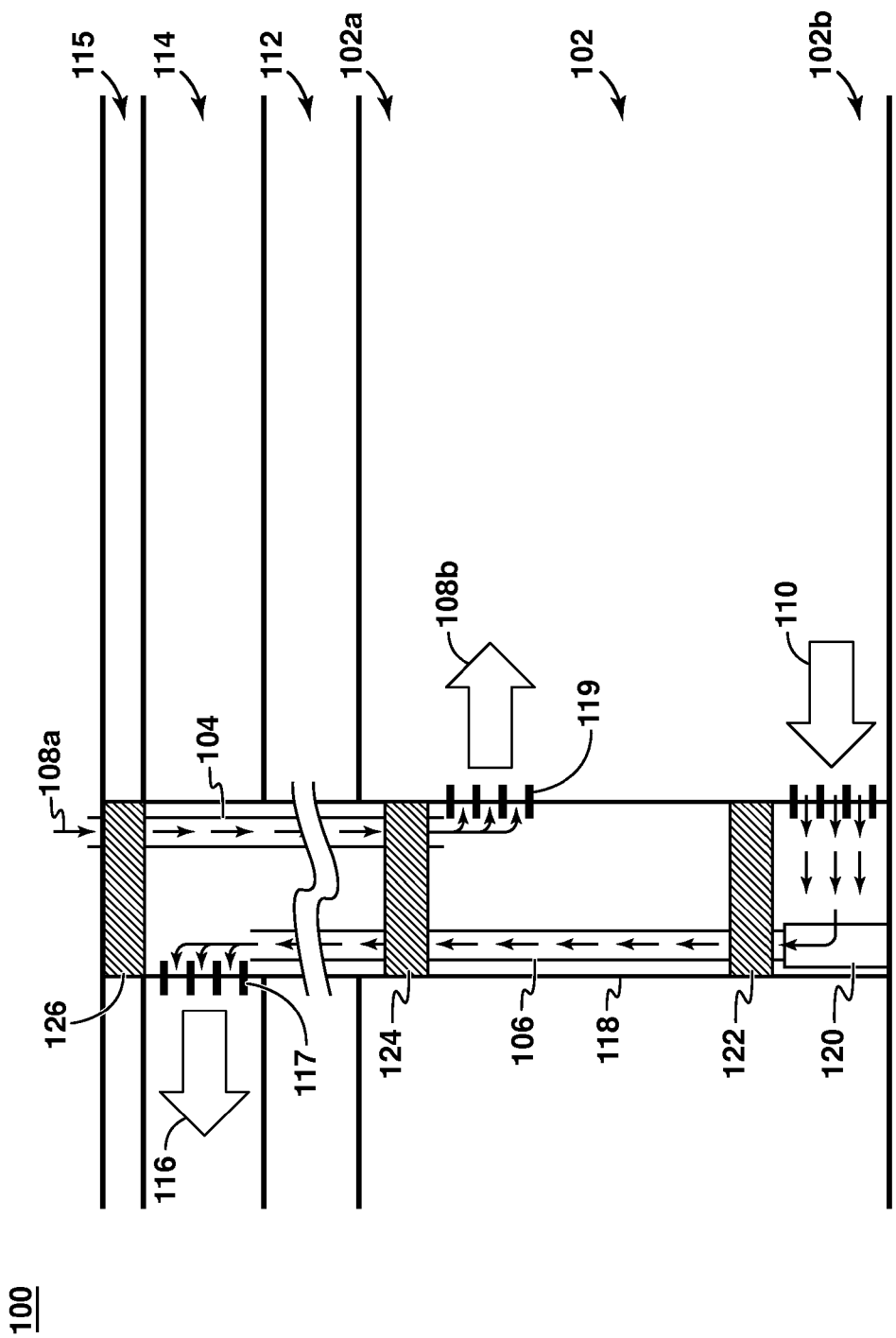

GASEOUS SEQUESTRATION METHODS AND SYSTEMS

CROSS-REFERENCE TO RELATED APPLICATION

This application claims the benefit of U.S. Provisional Patent Application 61/233,034 filed Aug. 11, 2009 entitled GASEOUS SEQUESTRATION METHODS AND SYSTEMS, the entirety of which is incorporated by reference herein.

TECHNOLOGY FIELD

Embodiments of the invention relate to methods and systems for gaseous sequestration. More specifically, methods and systems are provided for injecting gaseous emissions (GE) into a porous, fluid-filled, subterranean storage reservoir and controlling both the plume dimensions and the pressures by simultaneously withdrawing fluids therefrom. Additional benefits of controlling GE injection pressures may include reduced horsepower requirements for injection and reduced cost of equipment and ongoing operations.

TECHNICAL BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Storage of carbon dioxide ($CO_2$) and associated gases in deep fluid-filled formations will most likely be the major component of geologic storage to mitigate carbon dioxide emissions to the atmosphere. This is supported by the Intergovernmental Panel on Climate Change (IPCC) special report on carbon dioxide capture and storage and subsequent researchers who have estimated that the storage capacity in deep fluid filled formations is sufficient to hold worldwide emissions from large stationary sources equivalent to 100 or more years capacity. These formations have at least 10 times the capacity of known oil and gas fields and 100 times the capacity of coal seams. In addition, deep fluid filled formations are often located in close proximity to large stationary sources of $CO_2$ so the cost of transport (usually by pipeline) can be minimized. The above capacity estimates however, assume that in-situ brine in the deep fluid filled formations can and will be displaced in the vicinity of injection sites and that pressure containment by overlying primary caprock layers will be effective.

Safe storage means that buoyant carbon dioxide ($CO_2$) and associated gases, collectively referred to as gaseous emissions (GE) injected into a fluid filled subterranean formation will not leak upwards, over the long term, to either the potable ground water (usually near the surface) or to the atmosphere.

Efficient storage generally involves supercritical phase GE injection that utilizes as much of the permitted pore space as possible within the vertical thickness of the deep fluid filled formation. The US National Energy Technology Laboratory (NETL) defines safe and efficient storage as having 99% permanence and 30% efficiency. Permits for storage will, in most jurisdictions, be granted for a defined geographical area and allowed only in porous intervals that are deemed to be deep enough for both safe and efficient storage. A commonly quoted depth for $CO_2$ to be in supercritical phase is greater than 800 meters below surface. At this depth, or greater, the in situ fluid is usually a high salinity brine so the literature often refers to target storage reservoirs as "deep saline formations". There will likely be multiple stakeholders involved in the leasing and permit process and multiple storage areas may be permitted within a given deep fluid filled formation. It is therefore in the interest of all parties to confine the injection plume to as small an area as possible and to operate the injection site at a safe pressure in the subsurface.

Current carbon dioxide disposal systems into deep fluid filled formations will either increase pressure in the low compressibility fluid filled formation and/or displace fluid(s) outside the vicinity of the injection well(s) and possibly outside of the permitted area. In addition, the density of the injected gases (including supercritical phase carbon dioxide) is less than the in-situ fluid ("dense fluid") resulting in buoyant gas override and possible upward leakage over time through overlying primary caprocks and possibly other confining strata.

Risks of injection operations to be mitigated include: cap rock fracturing (when subjected to high injection pressures), cap rock leaching by the slightly acidic injected gas—dense fluid mixture and/or excursion of the mixed fluids within the storage reservoir outside the permit area and/or into overlying confining strata, potable water aquifers, the oceans or the atmosphere.

Small scale (about 1 Mega tonne/year of $CO_2$) demonstration projects to date have assumed that an injection storage solution will be able to accommodate the necessary volumes of injected $CO_2$ when done in high-capacity fluid filled formations. An implicit assumption in models of these demonstration projects done to date is that the in-situ fluid will be displaceable away from the injection site when injection is done at a larger scale (~100 Mega tonne/year of $CO_2$). Example projects with one or two wells utilizing injection-only fluid displacement technology include Sleipner and Snohvit in the Norwegian North Sea, In Salah in Algeria, Ketzin in Germany and LaBarge in the USA. The Sleipner plume has been imaged utilizing repeat seismic surveys that show both upward migration of the plume from the horizontal well to the caprock and spreading away from the point of injection. Models have also been constructed for the above examples to gain better understanding of the impact of plume buoyancy causing both upward movement to the base of the caprock and lateral migration away from the injection well.

What is needed are new approaches to sequestering large volumes of gaseous emissions (GE) in subsurface reservoirs, for long periods of time, while mitigating the risk of over pressuring and possible plume seepage to the surface or into adjacent formations that may contain valuable or fragile natural resources.

Some material relevant to the problem of CO2 storage in deep saline aquifers includes: WILKINSON, S, et al., (2009) "Subsurface design considerations for carbon dioxide storage", GHGT-9, Energy Procedia I, 3047-3054; and accompanying presentation materials of November 2008; NORDBOTTEN, C., et al., (2005) "Injection and Storage of $CO_2$ in Deep Saline Aquifers: Analytical Solution for $CO_2$ plume evolution During Injection" Transp. Porous Med. 58:339-360.; STAUFFER, P.H., et al., (2008): "Combining geologic data and numerical modeling to improve estimates of the $CO_2$ sequestration potential of the Rock Springs Uplift, Wyo.", GHGT-9, Washington D.C., November 2008, Energy Procedia 00 (2008) 000-000; KUUSKRAA, V. A., et al., (2009) "Using reservoir architecture to maximize $CO_2$ storage capacity", GHGT-9, Energy Procedia 1 3063-3070; and accompanying presentation materials of November 2008.; LEONENKO, Y., et al., (2008) "Reservoir Engineering to accelerate the dissolution of CO2 stored in aquifers", Environ. Sci. Technol 42, pp.2742-2747.

SUMMARY

In one embodiment of the present invention, a gaseous emission (GE) sequestration system is provided. The GE sequestration system includes a porous storage reservoir containing a dense fluid; a first tubing string, configured to provide and inject a supercritical or gaseous stream at or near the top of the porous storage reservoir above the base portion of the porous storage reservoir; and a second tubing string configured to withdraw the dense fluid from the base portion of the porous storage reservoir. In some embodiments, the first and second tubing strings may be enclosed in a single wellbore. The dense fluid may be injected into an overlying porous reservoir between caprock layers or may be delivered to the surface for treatment, or some combination. In additional embodiments, the tubing strings may include measurement and control equipment for creating and maintaining a hydrodynamic downward gradient between the overlying reservoir and the underlying storage reservoir and preventing the overpressuring of either reservoir; possibly causing damage to the caprock layers.

In a second embodiment of the invention, methods of sequestering GE are provided. The methods include injecting a gaseous stream at the top of a porous storage reservoir above a base portion of the porous storage reservoir with a first tubing string; and withdrawing a dense fluid from the base portion of the porous storage reservoir with a second tubing string. In some embodiments, the first and second tubing strings may be enclosed in a single wellbore. The dense fluid may be injected into an overlying porous reservoir between caprock layers or may be delivered to the surface for treatment, or some combination. In additional embodiments, the tubing strings may include measurement and control equipment for creating and maintaining a hydrodynamic downward gradient between the overlying reservoir and the storage reservoir and preventing the overpressuring of either reservoir; possibly causing damage to the caprock layers.

BRIEF DESCRIPTION OF THE DRAWINGS

The foregoing and other advantages of the present disclosure may become apparent upon reviewing the following detailed description and drawings of non-limiting examples of embodiments in which:

FIGS. 1A-1B are illustrations of a subsurface formation having multiple zones and tubing strings for gas sequestration, where withdrawn fluids are re-injected in an overlying reservoir in accordance with certain embodiments of the present disclosure;

DETAILED DESCRIPTION

Figure 1B:
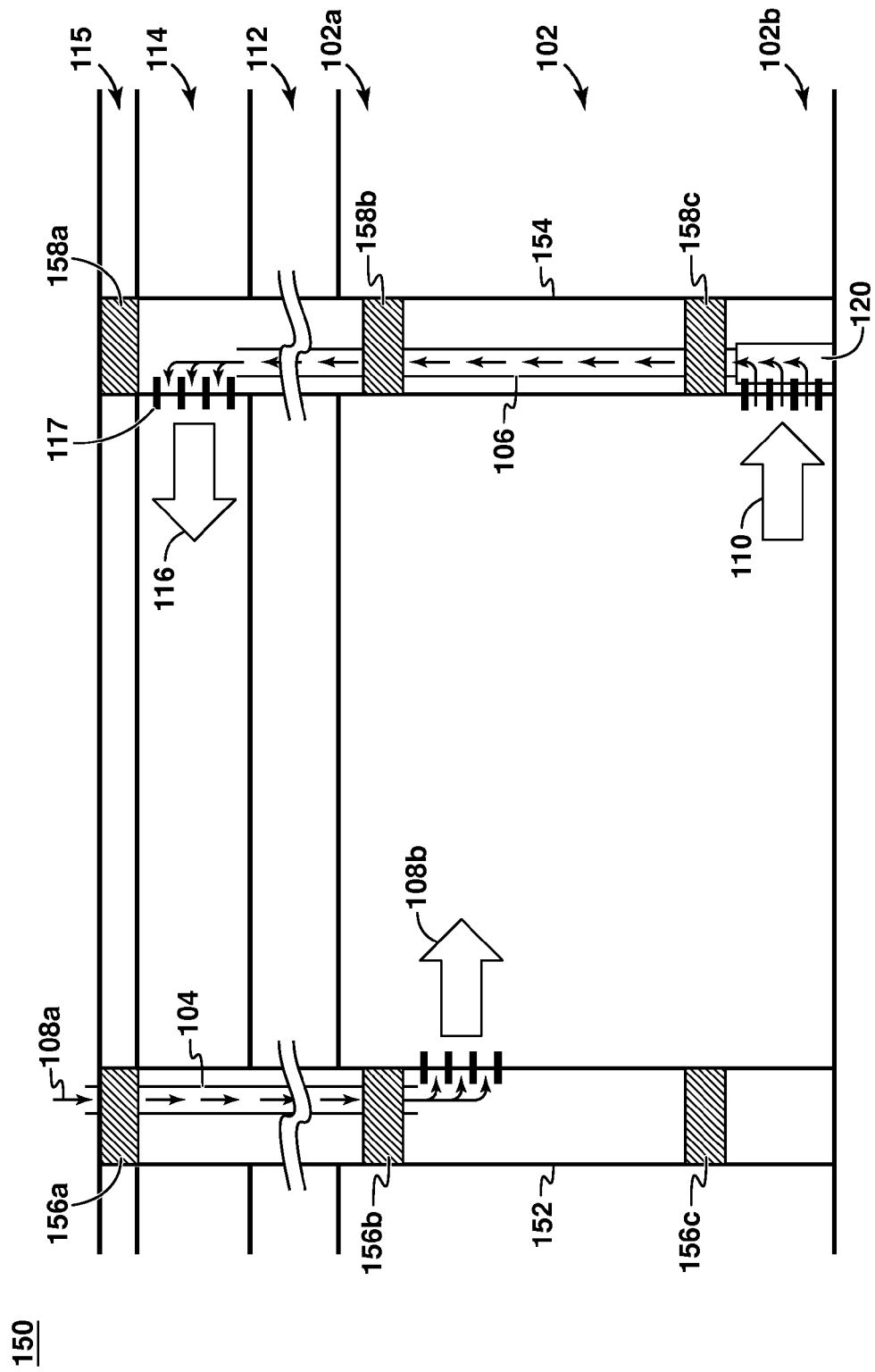

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

DEFINITIONS

Various terms as used herein are defined below. To the extent a term used in a claim is not defined below, it should be given the broadest definition persons in the pertinent art have given that term as reflected in at least one printed publication or issued patent.

The terms "a" and "an," as used herein, mean one or more when applied to any feature in embodiments of the present inventions described in the specification and claims. The use of "a" and "an" does not limit the meaning to a single feature unless such a limit is specifically stated.

The term "about" is intended to allow some leeway in mathematical exactness to account for tolerances that are acceptable in the trade. Accordingly, any deviations upward or downward from the value modified by the term "about" in the range of 1% to 10% or less should be considered to be explicitly within the scope of the stated value.

The term "cap rock," as used herein, means a volume, portion, or strata of a subsurface formation that is substantially non-porous and non-permeable, such that fluid cannot flow through the cap rock unless the cap rock is fractured or structurally compromised in some fashion. In addition, the non-porous cap rock is situated directly above a porous portion of a subsurface formation to substantially prevent any upward flow of fluids from the porous portion of the formation.

In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The term "dense fluid," as used herein means a fluid found in a porous reservoir (e.g. "in-situ") with a higher density than the injected gaseous emissions (GE) at reservoir conditions. Reservoir conditions refers to the temperature and pressure in the porous reservoir containing the dense fluid and will vary according to the depth, composition, pore structure, and other parameters of the reservoir. Examples of dense fluids include brine, liquid hydrocarbon fluids, and combinations of these.

The term "exemplary" is used exclusively herein to mean "serving as an example, instance, or illustration." Any embodiment described herein as "exemplary" is not necessarily to be construed as preferred or advantageous over other embodiments.

The term "gaseous emissions," as used herein refers to fluids that are a gas at atmospheric pressure and ambient surface temperatures and which result from a man made process or system, such as a refinery, natural gas processing plant, power plant, factory, other emitting system, or any combination of these. The most common examples of such fluids include carbon dioxide ($CO_2$), nitrogen ($N_2$), carbon monoxide (CO), sulfur dioxide (SO$_2$), hydrogen sulfide (H$_2$S), and combinations of these and other impurities commonly found in flue gas.

The terms "preferred" and "preferably" refer to embodiments of the inventions that afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the inventions.

The terms "substantial" or "substantially," as used herein, mean a relative amount of a material or characteristic that is sufficient to provide the intended effect. The exact degree of deviation allowable in some cases may depend on the specific context.

The definite article "the" preceding singular or plural nouns or noun phrases denotes a particular specified feature or particular specified features and may have a singular or plural connotation depending upon the context in which it is used.

DESCRIPTION OF EMBODIMENTS

Embodiments of the present invention provide a method to enhance the safe and efficient storage of gaseous emissions (GE) containing a high percentage of CO$_2$, in deep subterranean formations containing dense fluids.

In one particular embodiment, two enclosed tubing strings are provided for safe injection of gaseous emissions down one of the tubing strings into a porous storage reservoir containing a dense fluid (e.g. deep fluid filled formation). The second tubing string is for withdrawing the in-situ dense fluid from the base of the storage reservoir. The dense fluid may then be delivered to the surface or re-injected via the second tubing string into an overlying dense fluid filled reservoir to create a higher pressure "hydrodynamic seal" that will mitigate upward migration of gaseous emissions should they leak through the primary overlying impermeable zones (cap rock) above the storage zone. In more particular embodiments, the two tubing strings may be positioned in a single wellbore to save space and installation cost. If optimally located, the higher pressure dense fluid disposal zone may also be utilized to provide pressure support for offsetting mineral leases (oil and gas production activities).

Referring now to the figures, FIGS. 1A-1B are illustrations of a subsurface formation having multiple zones and tubing strings for gas sequestration, where withdrawn fluids are re-injected in an overlying reservoir in accordance with certain embodiments of the present disclosure. In particular, FIG. 1A includes a gaseous sequestration system 100 including a porous storage reservoir 102 containing a dense fluid and having a top portion 102a and a base or bottom portion 102b, a first tubing string 104 and a second tubing string 106. As shown, the first tubing string 104 is configured to provide a GE gaseous stream 108a and inject the GE stream 108b into the porous storage reservoir 102 via perforations 119 at or near the top portion 102a and the second tubing string 106 is configured to withdraw the dense fluid 110 from the base portion 102b.

FIG. 1A shows additional features, including a cap rock formation 112 and an overlying porous reservoir 114 above the cap rock 112 configured to receive the dense fluid 116 as it is re-injected through the second tubing string 106 and perforations 117 in well bore(s) 118. The well bore(s) 118 are configured to house the first and second tubing strings 104, 106, a pump 120 to move the dense fluid from the porous storage reservoir 102 to the overlying porous reservoir 114, and packers 122, 124, and 126 to hold the tubing strings in place. The overlying porous reservoir 114 is further contained by an overlying caprock 115.

FIG. 1B shows an alternative embodiment of the gaseous sequestration system of FIG. 1A including a system 150 having two separate wellbores 152 and 154 for first tubing string 104 and second tubing string 106, respectively. Although system 150 shows three packers for each well bore (156a-156c and 158a-158c), it should be noted that this arrangement may not be necessary because there is expected to be only one fluid per well bore (e.g. GE for well bore 152 and dense fluid for well bore 154). Although fewer packers is a potential advantage, the system 150 would require two completions instead of one for system 100. As such, system 150 may only be utilized in particular circumstances, such as when two well bores 152 and 154 already exist, but are not of sufficient size to accommodate two tubing strings 104 and 106.

Figure 2:
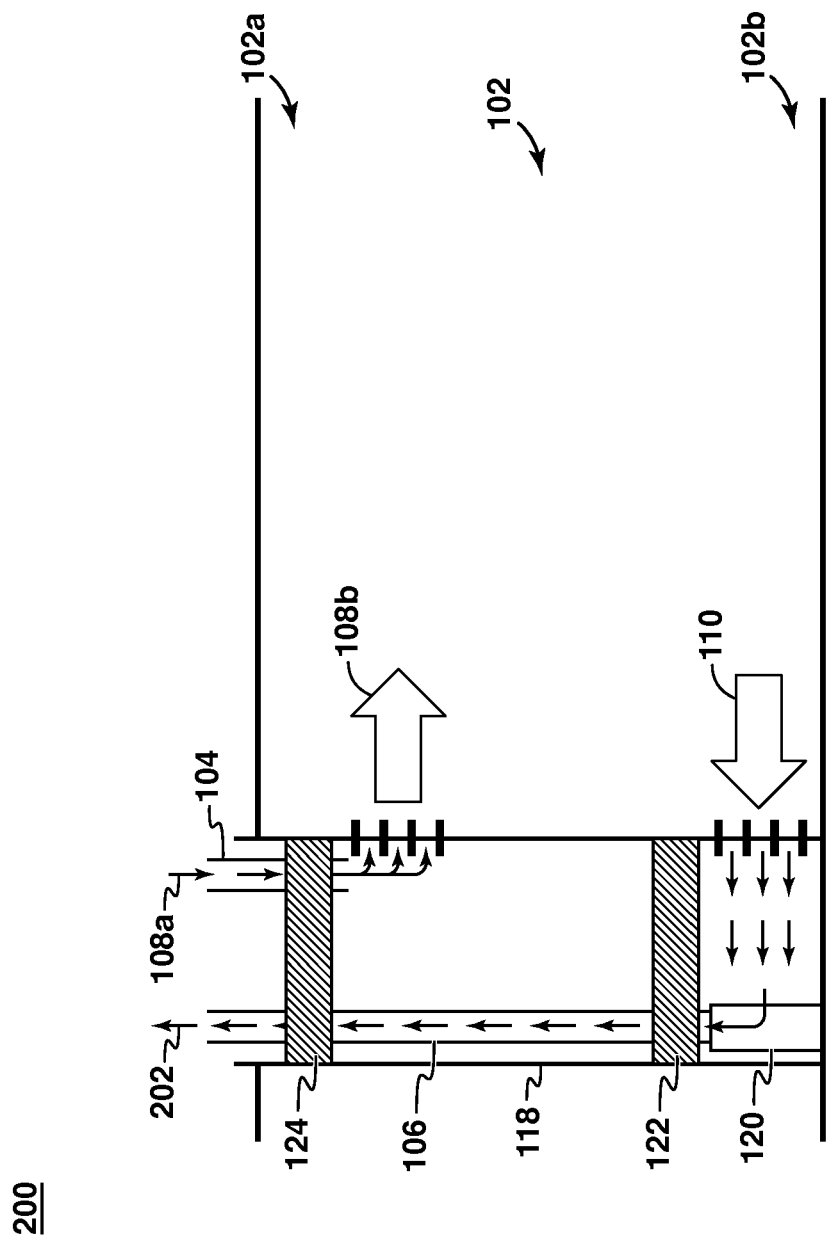
FIG. 2 is an illustration of an alternative embodiment of the systems of FIGS. 1A-1B, where withdrawn fluids are removed to surface.

FIG. 2 is an illustration of an alternative embodiment of the systems of FIGS. 1A-1B, where withdrawn fluids are removed to surface. As such, FIG. 2 may be best understood with reference to FIGS. 1A-1B. The illustration includes a gaseous sequestration system 200 similar to the system 100, but where the withdrawn dense fluid 110 is brought to surface 202 through the second tubing string 106 where it may undergo further treatment including extraction of residual hydrocarbons and then be disposed of to a separate disposal well or other facility (not shown). Additional or alternative uses for or processes for the withdrawn dense fluids are limitless and may depend on the composition of the fluids. In some implementations, the withdrawn dense fluids at the surface may be mixed with supercritical gaseous emissions using surface- or seafloor-based mixing equipment (not shown). The mixing equipment may be configured to solubilize the CO$_2$ or other gases in the gaseous emissions. In some implementations, additives may be introduced in the mixing equipment to enhance the mixing and/or to further stabilize the supercritical gaseous emissions in the withdrawn dense fluids. The mixed dense fluids and gaseous emissions, in some implementations, may be injected into the formation. For example, the mixed composition may be re-injected into the formation in the overlying region 114. Additionally or alternatively, the mixed composition may be injected into another well for one or more of the various reasons fluids may be injected into the formation, such as for sequestration, pressure maintenance, flooding, etc.

Figure 3:
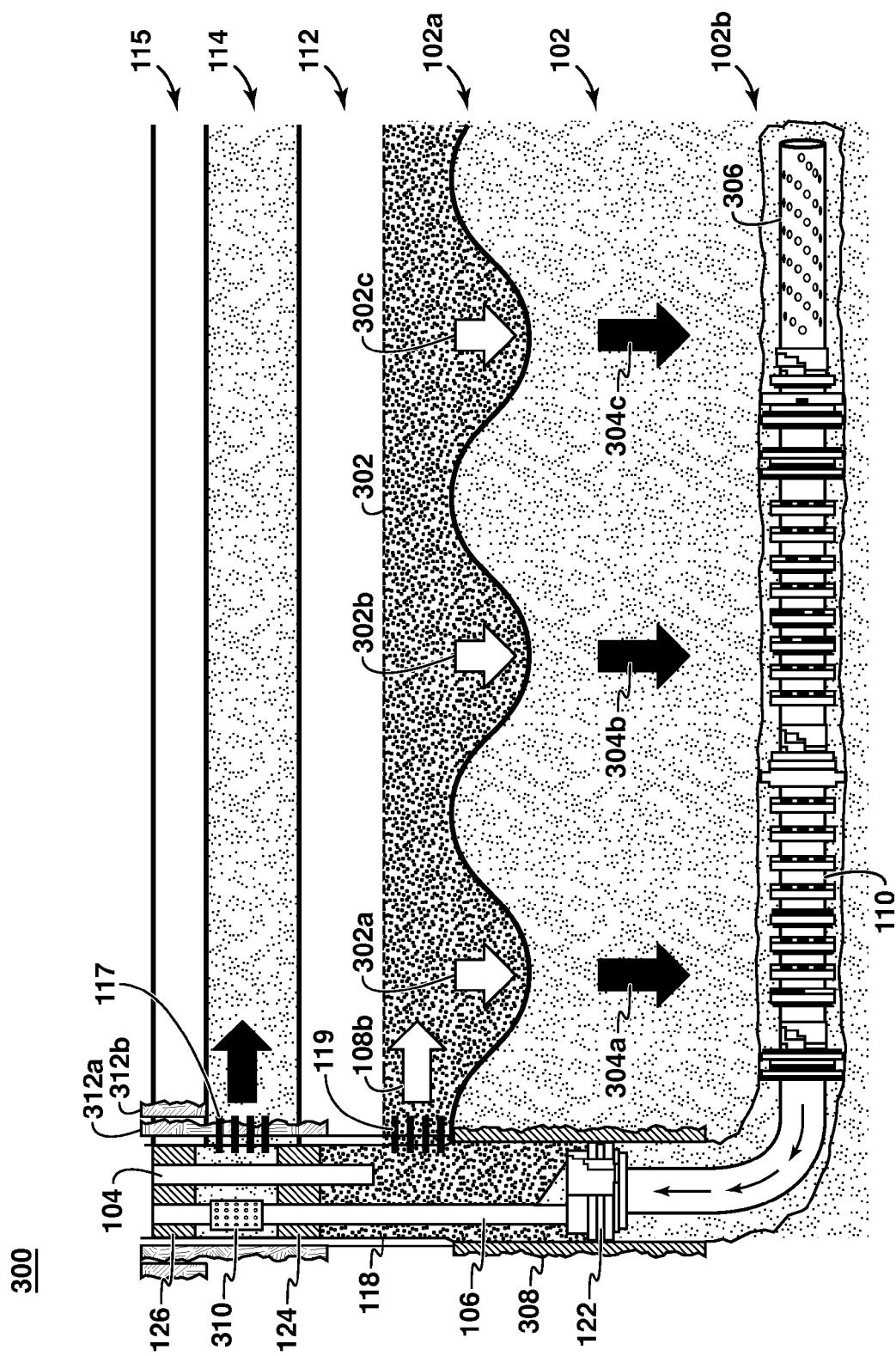
FIG. 3 is an illustration of another embodiment of the system of FIGS. 1A-1B showing a representative distribution of the injected GE, withdrawn fluids and re-injected fluids.

FIG. 3 is an illustration of another embodiment of the system of FIGS. 1A-1B showing a representative distribution of the injected GE, withdrawn fluids and re-injected fluids. As such, FIG. 3 may be best understood with reference to FIGS. 1A-1B. The illustration includes a gaseous sequestration system 300 similar to system 100, but having a few more details. In particular, the system 300 includes an illustration of a gaseous emission plume 302, which may include exemplary down-coning portions 302a, 302b, and 302c. The plume 302 is expected to form as the gaseous emissions (GE) are injected at 108b via the first tubing string 104 and perforations in the casing-cement annulus formed by wellbore 118 and, optionally, additional casing strings 312a and 312b external to the main wellbore. Dense fluids are withdrawn at perforations 110 via the second tubing string 106, optionally via a pumping device 308. In the system 300, a more detailed view of the withdrawal equipment 306 attached to the second tubing string 106 is provided. This equipment may include any number of screens, packers, in-flow control devices and related equipment and controls configured to provide a controlled withdrawal of dense fluid as shown by arrows 304a, 304b, and 304c, which represent exemplary fluid withdrawals that may be independently adjusted either at the time of installation or by subsequent wellbore interventions or by dynamic controls from installed control systems. Adjustments made after initial installation would depend on the nature and extent of the plumes 302a-302c, the pressure and temperature conditions in the porous storage area 102, and other factors related to the site specific geology and final configuration of 306 relative to the subterranean structure(s).

As indicated, the down-coning portions of the plume (302a-302c) and the withdrawal of dense fluid shown by arrows 304a-304c are simply for illustrative purposes and the system 300 is not limited to one, two, three, or any particular number of withdrawal locations or configurations. Given the teachings of the disclosure, a person of ordinary skill in the art is capable of designing, operating, or improving a system 300 having the appropriate withdrawal equipment 306 in the tubing string 106 depending on the conditions in the storage location 102.

Note that the second tubing string 106 may further include data collection (measuring) devices, including but not limited to transducers, flow meters, and sampling ports, along the length of the completion ending at equipment 306 configured to obtain data from the porous storage reservoir 102 such as pressure, temperature, composition, and combinations of these. Similar equipment may also be located in the second tubing string 106 at or near the overlying porous reservoir 114 or inside the overlying reservoir 114 itself. Also shown is a pumping device 308 designed to assist and control dense fluid withdrawals and reinjection and an injection device 310.

In some embodiments of the disclosure, the overlying porous reservoir 114 is a reservoir quality formation with sufficient porosity and permeability to accept dense fluid that is injected under elevated pressure from either induced pressure differentials as a result of injection of GE into reservoir 102 or by activation of the pumping device 308 and directed to reservoir 114 through the injection device 310, which may include injection ports protected and operated by a "sliding sleeve" device (not shown). The injection device 310 is configured to open holes in the second tubing string 106 and adjacent perforations 117 through the casing-cement annulus (well bore) 118 and any other casing strings external to the main borehole (e.g. 312a, 312b) opposite the overlying porous reservoir 114.

The gaseous emissions (GE) plume 302 is created within the storage reservoir 102 by injection of GE via the first tubing string 104 and via the perforations 119 in the wellbore casing-cement sheath 118 located at the top portion 102a of the primary storage reservoir 102 with its shape and lateral extent being determined by pressure gradients and buoyant forces in the reservoir offset by downward pressure gradients caused by controlled offtake (show by arrows 304a, 304b, and 304c) from the underlying horizontal withdrawal equipment 306. While exemplary variations in plume dimensions (302a-302c) are illustrated, it should be understood that such plumes are representative only and are not necessarily to scale. The plume dimensions will vary in time and space according to the multitude of parameters that may affect fluid flow in a formation. As described herein, the flow of the GE plumes 302 can be customized, or encouraged to follow a preferred course, based on operational controls, such as the use of the withdrawal equipment 306. Accordingly, the specific dimensions or relationships illustrated in FIG. 3 are exemplary only and are not considered limiting.

The GE storage zone 102 is a porous reservoir with sufficient capacity and rock quality to store targeted volumes of injected gaseous emissions. Fluid withdrawal from the lower intervals 102b of the primary storage zone 102 are controlled within the horizontal completion by manipulating either pumping rates from the installed pumping device 308 or by controlling back-pressure at the top of the second tubing string 106 where natural flow is possible. The impact of controlled dense fluid offtake will be to draw the buoyant plume 302 downwards, such as through cones 302a, 302b, and 302c and to thereby increase the efficiency of GE storage by mitigating excessive lateral spreading of the plume(s) and simultaneously promoting mixing of the gaseous plume and the dense fluid to promote solubilization of the GE in the in situ fluid and thereby enhance storage of the injected GE. The controlled withdrawal of dense fluid from the lower intervals 102b of the primary storage zone 102 will also serve to increase the safety of GE storage by mitigating excessive pressure buildup that could result from high pressure injection of GE into a fluid filled formation.

The horizontal completion configuration 306 of the dense fluid production string is preferably located low in the primary storage reservoir 102 and completion equipment will be chosen to manage pressure drawdown and distribution along the length of the completion. The pumping device 308 and associated packer 122 are configured to serve as a wellbore pack-off to isolate the GE in the annulus above the packer 122 from the dense fluid in the annulus below the packer 122. The pump 308 may also be equipped to allow for installation of a dense fluid lift pump, if needed, to promote removal of dense fluid from the base 102b of the primary storage zone 102 and either re-inject it in the overlying porous reservoir 114 or lift it to the surface or the seafloor at the top of the second tubing string 106.

The packer 124 may serve as a wellbore pack-off to isolate the GE in the annulus below the packer from the dense fluid in the annuli above the packer 124. The packer 126 may serve as a wellbore pack-off to isolate the dense fluid in the annulus below the packer 126 from the completion fluid in the annuli above the packer 126.

In some embodiments, the first tubing string 104 serves as a conduit to either the surface or the seafloor for injection of GE into the top 102a of the primary storage zone 102. Pressure, rates and compositions can be monitored at the top or along the full length of the tubing string 104 by means of attached measuring devices including but not limited to transducers, flow meters and sampling ports. The second tubing string 106 serves as a conduit to either the surface or the seafloor for removal of dense fluid from the base 102b of the primary storage zone 102 and either re-inject it in the overlying porous reservoir 114 or lift it to the surface or the seafloor. Pressure, rates and compositions can be monitored at the top or along the full length of the tubing string 106 by means of attached measuring devices including but not limited to transducers, flow meters and sampling ports.

Figure 4A:
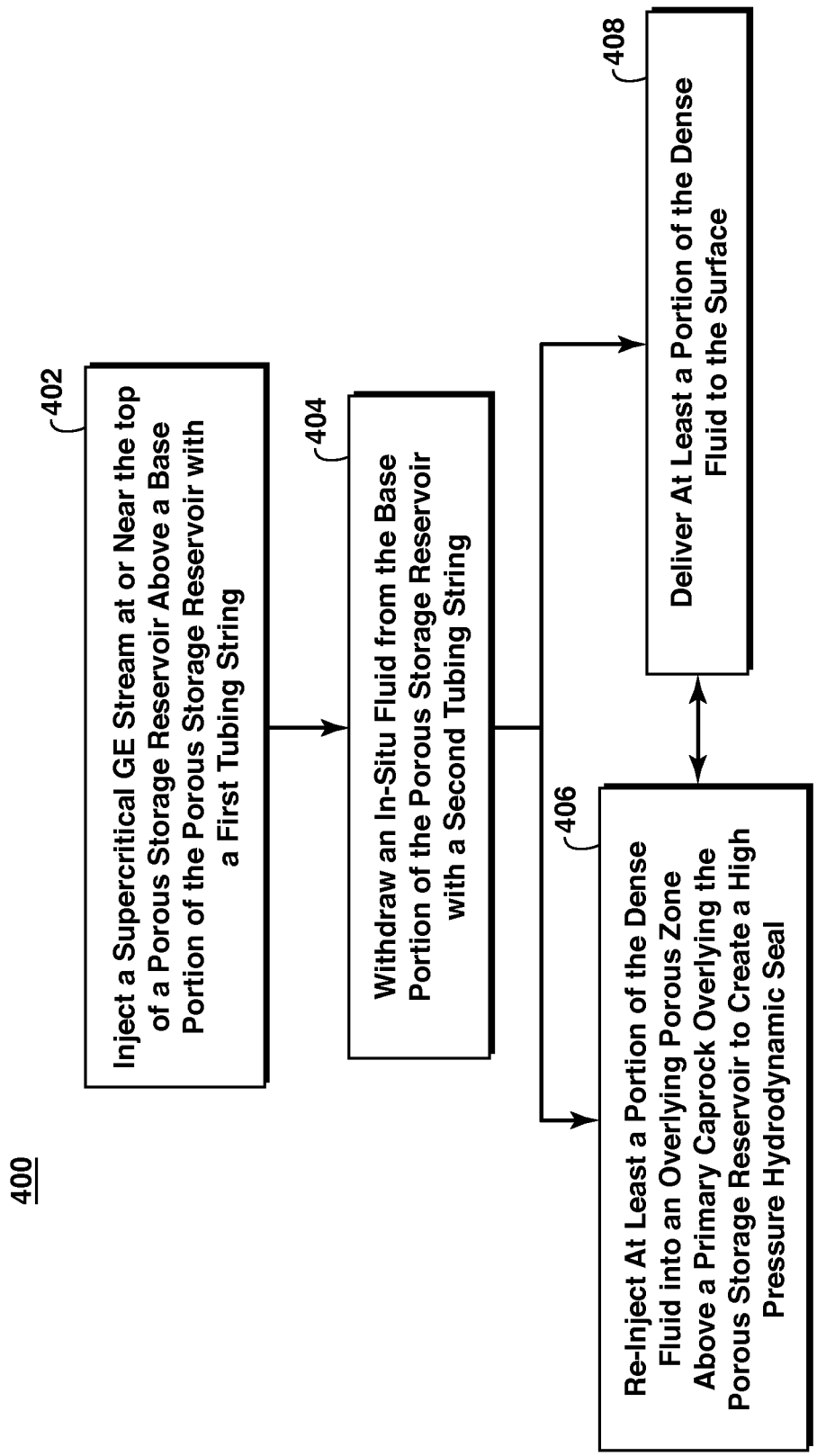
FIGS. 4A-4B are flow charts of at least two methods of sequestering gas in accordance with certain aspects of the present disclosure.
Figure 4B:
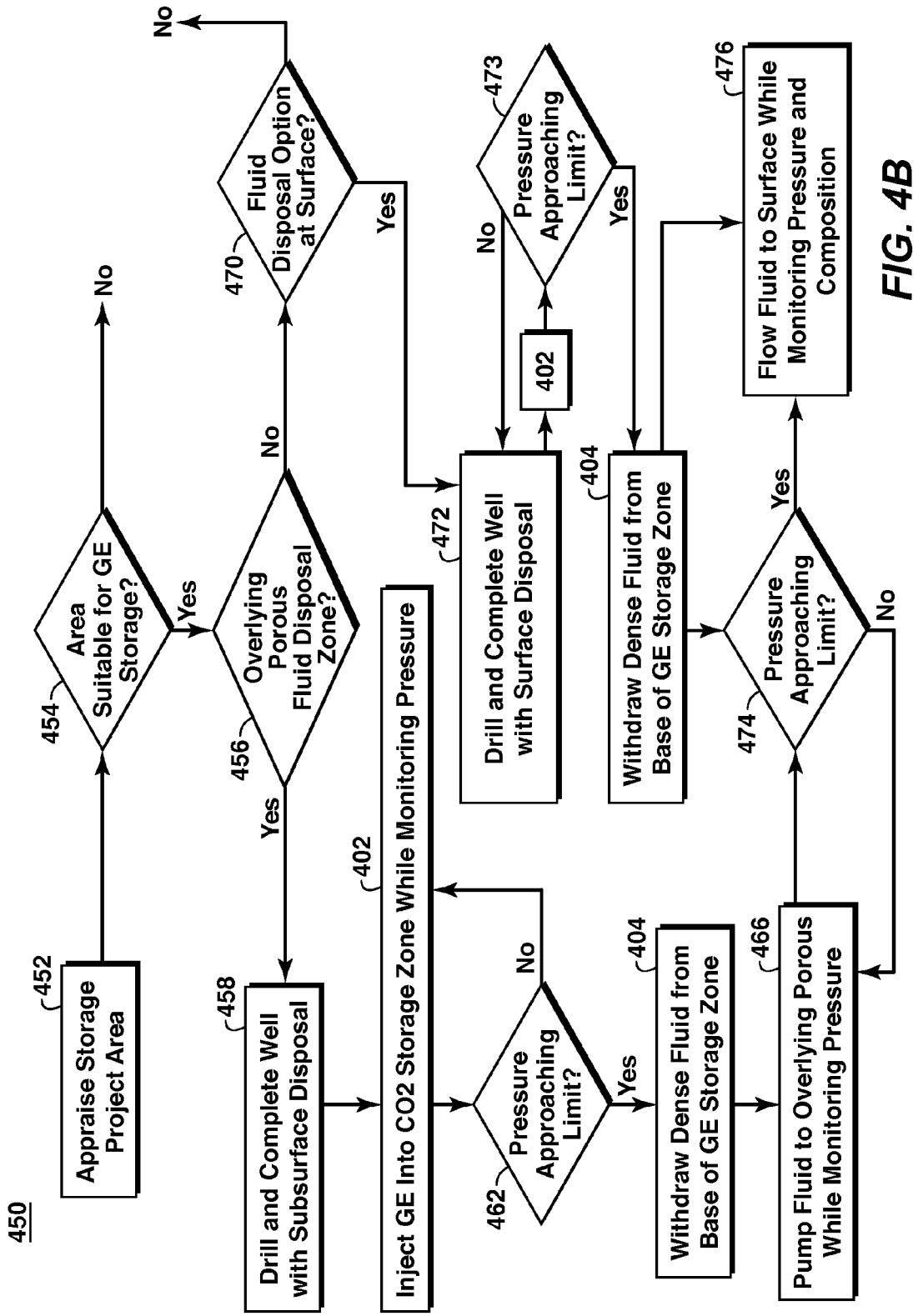

FIGS. 4A-4B are flow charts of at least two methods of sequestering gas in accordance with certain aspects of the present disclosure. In particular, FIG. 4A shows a method 400 including an injecting step 402 comprising injecting a supercritical GE stream at or near the top of a porous storage reservoir above a base portion of the porous storage reservoir with a first tubing string and a withdrawing step 404 comprising withdrawing an in-situ fluid from the base portion of the porous storage reservoir with a second tubing string. In one embodiment, each of the first and second tubing strings are enclosed in a single wellbore. Depending on the nature of the reservoir and overlying portions of the formations, the method 400 may include step 406, which includes taking at least a portion of the withdrawn dense fluid and re-injecting it into an overlying porous zone to create a hydrodynamic downward pressure gradient between the overlying fluid re-injection reservoir and the underlying porous storage reservoir. This approach may be carried out substantially by a system like system 100 or system 300. As such, step 406 may be best understood with reference to FIGS. 1 and 3.

Alternatively or in addition, the method 400 may include step 408, which includes delivering at least a portion of the dense fluid to the surface. As described above, once the dense fluid arrives at the surface, the options for the fluids are limitless. Exemplary uses for the dense fluid include treatment for disposal, storage, mixing with GE for re-injection, or some combination thereof, which may incorporate the use of the second tubing string. Step 408 may be substantially carried out by a system like system 200 shown in FIG. 2.

FIG. 4B shows an exemplary decision tree 450 including the steps of the method 400 that may be incorporated into certain aspects of the present disclosure. In particular, the method 450 includes an appraisal step 452 to ensure that the project area is suitable for storage of gaseous emissions (GE). The next step is a determination of whether the area is suitable 454. If suitable, then a determination 456 is made whether there is an overlying porous reservoir for injecting the dense fluid and if suitable, a well is drilled 458 for the sequestration system 100 or 300. In the next step 402, GE is injected into the storage reservoir and another determination is made whether the storage reservoir pressure is approaching its limit 462. If the limit is approaching, then dense fluid is withdrawn 404 from the storage reservoir and dense fluid is pumped to the overlying reservoir while pressure is monitored 466. If a pressure limit is reached in the overlying zone, then injection into that zone may be halted and the withdrawn dense fluids may be routed to the surface for treatment or storage or routed to a second overlying porous injection zone.

If there is no suitable overlying porous reservoir, then a determination 470 is made whether there is an appropriate dense fluid disposal option at the surface. A well is drilled 472 for the sequestration system 200 and GE is injected 402 into the storage reservoir. A determination is made whether the storage reservoir pressure is approaching its limit 473. If the limit is approaching, then dense fluid is withdrawn 404 from the storage reservoir and dense fluid is pumped to the surface while pressure is monitored 476. Note that the monitoring steps 462, 466, 473, and 476 may include pressure, rates, and compositions to ensure that conditions in the subsurface are within safety and efficiency specifications.

The secondary cap rock formation 310 may be chosen at each site (e.g. a shale or anhydrite zone) with sufficient thickness and low enough permeability to contain the dense fluid that is injected under elevated pressured from ports in the second tubing string 106 and adjacent perforations through the casing-cement annulus (well bore) 118 (and possibly additional casing strings, e.g. 312a and 312b) opposite the overlying porous reservoir 114.

The primary cap rock formation 112 may be chosen at each site (e.g. a shale or anhydrite zone) with sufficient thickness and low enough permeability to isolate gaseous emissions (GE) that are injected through tubing string 104 and adjacent perforations through the casing-cement annulus 118 opposite the top 102a of the GE storage zone 102 from the dense fluid that is injected under elevated pressure through side ports 307 in the tubing string 106 and adjacent perforations through the casing-cement annulus opposite the overlying porous fluid injection zone 114.

It should be noted that the disclosed systems 100, 200, 300 and methods 400 and 450 can be applied either in new wellbores or in refurbished wellbores, equipped with new or recoated tubing strings and packers, made of gaseous emissions and dense fluid tolerant materials for purposes of pressure containment and corrosion mitigation.

The presently disclosed systems 100, 200, and 300 and methods 400 and 450 are intended to cost-effectively address the most significant challenges of safety and efficiency associated with large scale storage of GE in deep saline formations. Certain features and benefits of the disclosed systems and methods include: i) active management of pressure in the storage zone 102 by controlled release of displaced dense fluid from the base of the storage zone 102b; ii) control the spread of the GE plume 302 away from the injection well and efficiently use the pore space within the permitted storage area of interest 102; iii) create a higher pressure fluid filled zone 114 above the GE storage zone 102 so that any leakage of GE through the cap rock 112 is "quenched" by the downward flow of dense fluid from the higher pressure hydrodynamic seal created in the porous zone above 114; and/or iv) withdraw the dense fluid from the base of the storage zone 102b to the surface and treat or dispose of the dense fluid at an alternative facility, thereby forgoing the creation of a hydrodynamic seal.

Further anticipated advantages may also include: i) reduce the number of wells 118 and footprint for deep saline formation storage within a permitted area; ii) provide a fluid filled conduit (e.g. the second tubing string 106) to the storage reservoirs 102 and 114 for monitoring of pressures and/or sampling of flow rates and compositions as necessary to meet monitoring and verification requirements of the storage permit; and iii) provide a GE filled conduit (e.g. the first tubing string 104) to the storage reservoir 102 for monitoring of pressures, running of injection flow profiles and/or sampling of flow rates and compositions as necessary to meet monitoring and verification requirements of the storage permit.

One alternative embodiment may involve drilling of multiple wells for the purpose of each well contributing to either GE injection, dense fluid production, dense fluid injection or monitoring of the formation. Such an approach would likely increase costs, but may be necessary under certain conditions.

Storage safety is enhanced in the present disclosure by managing the pressure of the storage zone below the containment pressure limits of overlying impermeable zones (cap rock) (e.g. 112 and 310) through controlled withdrawal of dense fluid from the porous storage zone 102. As an additional measure of backup safety protection the disclosed systems and methods also allow for increasing the pressure of overlying porous strata (e.g. 114) by injection of the previously withdrawn dense fluid into an overlying porous interval 114 that is not originally in direct pressure communication with the storage zone 102.

As an added efficiency benefit of the present disclosure, the withdrawal of dense fluid, if performed at optimum rates and locations relative to the carbon dioxide injection location, will promote downward movement of the normally buoyant injected GE and thereby have it occupy more of the pore space near the injection well. These optimum withdrawal rates can be calculated using either reservoir engineering analytical solutions or by building and running numerical models containing reservoir geology and fluid descriptions along with well descriptions.

Below is an example calculated result for sustainable brine withdrawal while also injecting equivalent reservoir volumes of $CO_2$ into the same homogeneous reservoir:

Given a 200 foot thick brine filled reservoir with 30 percent porosity, an average of 500 millidarcies of horizontal permeability and 50 millidarcies of vertical permeability, calculations show that a 2,000 foot long horizontal well placed 20 feet above the base of the reservoir could withdraw 5,000 barrels per day of brine from beneath a layer of injected $CO_2$. The equivalent injection rate of $CO_2$ to replace these withdrawn brine volumes at a constant pressure of 2,000 pounds per square inch and a temperature of 100 degrees Fahrenheit will be 11.8 million cubic feet per day or 228,000 tons of $CO_2$ per year.

Simultaneous brine withdrawal will also promote in situ mixing and dissolution of the GE in the dense fluid. This will help solubilize and thereby stabilize the injected carbon dioxide and prevent later migration of the injection plume away from the injection site.

As a cost reduction benefit of the present disclosure, the withdrawal and re-injection of the dense fluid may be accomplished within the same wellbore as is used for injection of the carbon dioxide into the target storage zone by use of dual tubing strings within the wellbore and a tubing conveyed down-hole pump. The use of dual tubing strings also facilitates cost-effective data collection from subsurface zones by providing two conduits from surface to the subsurface for gathering of pressure, temperature or compositional information.

EXAMPLES

The layering of the geologic system is a function of the history of deposition but is typically a sequence of porous intervals that readily transfer pressure and dense fluid when subjected to injection or production. These are typically interspersed with a series of seals or cap rocks that are sufficiently fine grained deposits considered to be non-porous and impermeable to flow except when subjected to forces (pressures) high enough to cause fracturing or parting of the rock.

Under normal conditions, an undisturbed sequence of formations in the subsurface will be filled with Fluid and be resident at pressures that follow the hydrodynamic gradient of the in-situ Fluid(s). This gradient may be fully continuous or slightly disturbed by the geologic history of uplift or subsidence that created the geologic sequence.

The following Table 1 gives representative values for the pressure gradients involved in a typical geologic system when injecting carbon dioxide.

| Representative values and ranges for purposes of illustration | Dense Fluid | Gaseous Emissions (GE) (e.g. Supercritical $CO_2$) | Potential Onset of Fractures or cap rock parting |
|---|---|---|---|
| Gradient psi/ft: average and range | 0.46 (0.45-0.47) | 0.25 (0.2-0.3) | 0.75 (0.65-0.85) |
| Fluid Disposal Zone: Pressure at 5,000 ft depth, psi | 2,300 (2,250-2,350) | 1,250 (1,000-1,500) | 3,750 (3,000-4,500) |
| GE Storage Zone: Pressure at 6,000 ft depth, psi | 2,760 (2,700-2,820) | 1,500 (1,200-1,800) | 4,500 (3,900-5,100) |

It should be noted that the maximum surface pressure for injection of GE will generally be the difference between the gaseous pressure at the depth of the storage zone (e.g. about 1,200 to about 1,800 psi for the GE storage zone at 6,000 feet deep) and the fracture pressure of the cap rock above the storage zone (e.g. from about 3,900 to about 5,100 psi for an average difference of about 3,000 psi).

In the disposal zone at 5,000 feet the pore pressure with a dense fluid gradient will be about 2,300 psi with the fracture gradient being 3,750 so additional dense fluid injection would be permitted to increase the pressure by about 3,750−2,300=1,450 psi. Note that these numbers are simply examples and are expected to vary significantly based on the type of formation, location of the formation, and other factors not taken into account here.

In the storage zone at 6,000 feet, the average permitted overpressuring would be 4,500 psi−2,760 psi=1,740 psi. In both cases a driving force will be created by GE injection to displace dense fluid from the pore space near to the injection well. If the dense fluid cannot move readily beyond confining lateral or vertical boundaries then the pressure will build in the porous interval.

Given uncertainty in the pressure of onset of fractures or cap rock parting there is a possibility that the cap rock could be compromised and therefore allow leakage of carbon dioxide under both injection induced pressure forces (0.75−0.46=0.29 psi/ft) and a buoyant gradient difference of (0.46−0.25=0.21 psi/ft) to move upwards through the rock layers. While the flow rate is likely to be severely restricted by the small and discontinuous nature of an induced fracture in the ductile cap rock material, it may, in an extreme case, create an unsafe condition for long term storage of the carbon dioxide or result in contamination of overlying fresh water or seepage to the atmosphere.

This situation can be avoided by both controlling the surface injection pressure and by allowing an outlet for the flow of dense fluid from the targeted injection zone in the vicinity of the injection well. The disclosed systems and methods allow for dense fluid withdrawal through the second tubing string with the result that both pressure is controllable and the buoyant forces on the injected carbon dioxide at the top of the porous zone is offset to a certain degree by the reduced pressures at the dense fluid withdrawal points.

Figure 5:
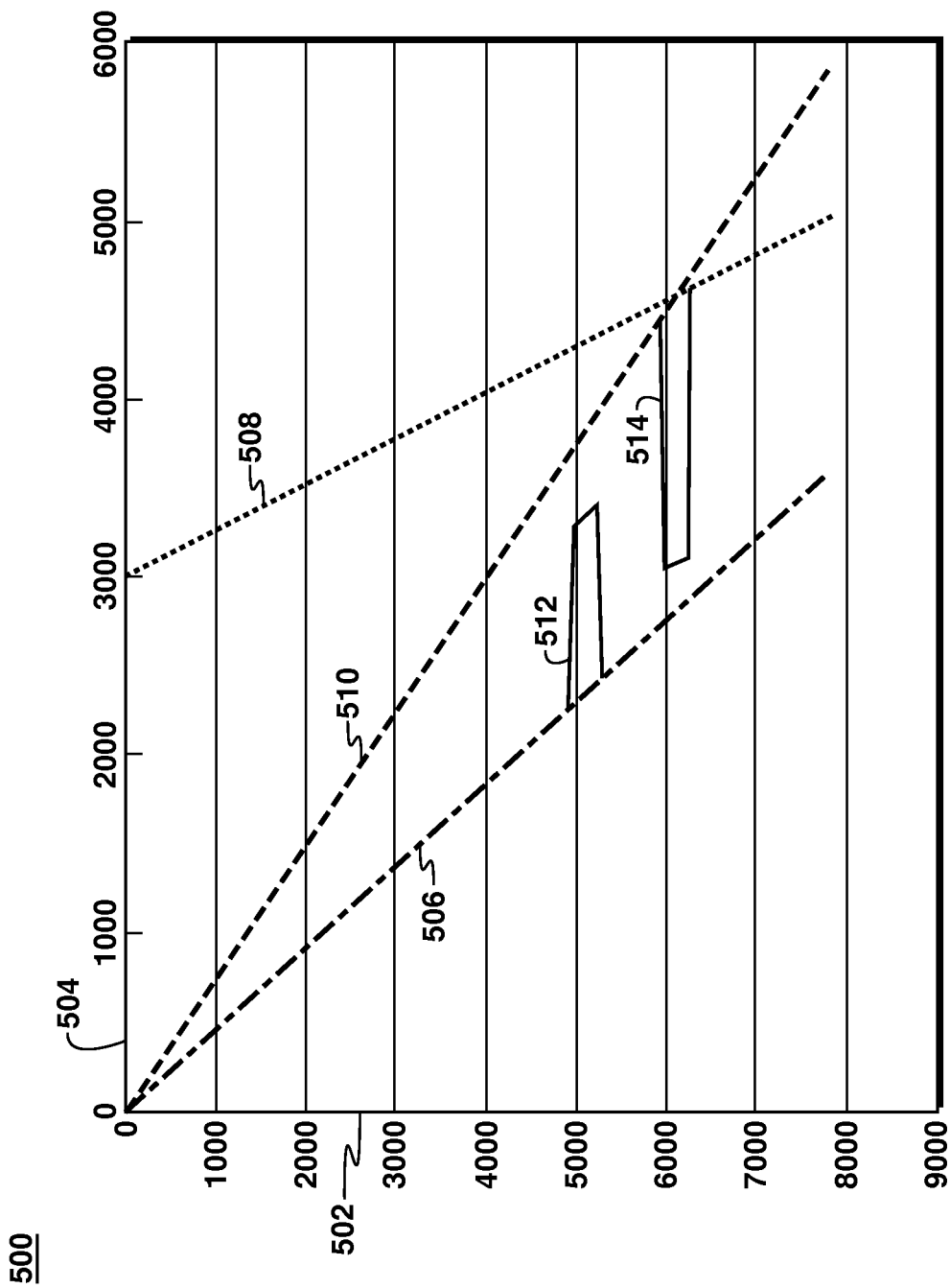
FIG. 5 is an exemplary graph illustrating certain pressure conditions that may be found in the systems of FIGS. 1A and 1B-3 and the methods of FIGS. 4A-4B.

FIG. 5 is an exemplary graph illustrating certain pressure conditions that may be found in the systems of FIGS. 1-3 and the methods of FIGS. 4A-4B. As such, FIG. 5 may be best understood with reference to FIGS. 1-3 and 4A-4B. In particular, the graph 500 shows a graphic representation of depth 502 in feet versus pressure 504 in pounds per square inch (psi) at an exemplary depth for a situation where GE at a wellhead pressure of 3,000 psi is injected down tubing into a zone at 6,000 feet depth. In particular, pressure gradients are provided for dense fluid 506, GE 508 (pressures represent those encountered within the first tubing string 104), and cap rock fracture gradients 510. Also shown are pressure envelopes for the overlying fluid injection zone 512 and the GE injection/storage zone 514. These pressure envelopes are created by the respective injection of dense fluid into an overlying zone (e.g. 114) and withdrawal of dense fluid from the storage zone 102.

Note, that without application of the disclosed systems and methods, there are no pressure envelopes 512 and 514, and the pressure in the injection zone could rise from a normal dense fluid gradient pressure of 2,760 psi to a cap rock fracture pressure of 4,500 psi and thus present an issue of potential leakage from the storage zone.

With application of the disclosure, the pressure 514 in the storage zone could be reduced by dense fluid withdrawal to approximately 3,100 psi and thus remove safety concerns about leakage. At the same time, injection of the withdrawn dense fluid into an overlying zone at 5,000 feet depth could increase the dense fluid pressure 512 to a pressure greater than about 3,300 psi, thus providing a higher pressure dense fluid filled zone that would result in a "hydrodynamic downward dump flood" that would "quench" upwardly mobile GE escaping from the storage zone.

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. A gaseous emissions (GE) sequestration system, comprising:
    a porous storage reservoir containing a dense fluid;
    a first tubing string, configured to provide and inject a gaseous stream at or near the top of the porous storage reservoir above the base portion of the porous storage reservoir;
    a second tubing string configured to withdraw the dense fluid from the base portion of the porous storage reservoir, wherein the first and second tubing strings are at least partially enclosed in a single wellbore;
    a non-porous cap rock formation above the porous storage reservoir that confines the porous storage reservoir; and
    an overlying porous reservoir above the caprock, wherein the second tubing string is configured to re-inject the dense fluid into the overlying porous reservoir to increase a fluid pressure in the overlying porous reservoir to create a high pressure hydrodynamic seal between the porous storage reservoir and the overlying porous reservoir.

2. The system of claim 1, wherein the dense fluid is withdrawn at a controlled rate from the base portion of the storage reservoir.

3. The system of claim 2, further comprising at least one storage reservoir data collection device configured to obtain data related to a property of the porous storage reservoir selected from the group consisting of: pressure, temperature, composition, and any combination thereof.

4. The system of claim 3, further comprising a control system configured to maintain an operating pressure in at least the porous storage reservoir utilizing the at least one storage reservoir data collection device, wherein the operating pressure is below an upper pressure limit of the porous storage reservoir.

5. The system of claim 4, further comprising at least one overlying reservoir data collection device configured to obtain data related to a property of the overlying porous reservoir selected from the group consisting of: pressure, temperature, composition, and any combination thereof.

6. The system of claim 5, wherein the control system is further configured to maintain the high pressure hydrodynamic seal by controlling at least the pressure in each of the porous storage reservoir and the overlying porous reservoir so that they create a positive downward force to mitigate potential leakage of GE from the underlying reservoir.

7. The system of claim 6, wherein the control system further includes at least screens, packers, in-flow control devices, and any combination thereof configured to control the pressure in the porous storage reservoir and the overlying porous reservoir.

8. The system of claim 1, wherein the second tubing string is configured to deliver at least a portion of the in-situ fluid to the surface for treatment or storage or some combination of both.

9. A method of sequestering a gas, comprising:
    injecting a gaseous stream at the top of a porous storage reservoir above a base portion of the porous storage reservoir with a first tubing string;
    withdrawing a dense fluid from the base portion of the porous storage reservoir with a second tubing string, wherein the first and second tubing strings are enclosed in a single wellbore; and
    further comprising re-injecting at least a portion of the dense fluid into an overlying porous reservoir above a primary caprock overlying the porous storage reservoir to create a high pressure hydrodynamic seal.

10. The method of claim 9, further comprising delivering at least a portion of the dense fluid to the surface, for treatment or storage or some combination of both, using the second tubing string.

11. The method of claim 9, further comprising collecting data from the overlying porous reservoir selected from the group consisting of pressure, temperature, composition, and any combination thereof using at least one overlying reservoir data collection device.

12. The method of claim 11, further comprising collecting data from the porous storage reservoir selected from the group consisting of pressure, temperature, composition, and any combination thereof using at least one storage reservoir data collection device.

13. The method of claim 12, further comprising maintaining an operating pressure in at least the porous storage reservoir utilizing a control system configured to utilize data from the at least one storage reservoir data collection device, wherein the operating pressure is below an upper pressure limit of the porous storage reservoir.

14. The method of claim 13, further comprising controlling at least the pressure in each of the porous storage reservoir and the overlying porous reservoir utilizing the control system configured to utilize data from the at least one storage reservoir data collection device and the at least one overlying reservoir data collection device, so that they create a positive downward force to mitigate potential leakage of GE from the underlying reservoir to maintain the high pressure hydrodynamic seal.

15. The method of claim 14, wherein the control system further includes at least screens, packers, in-flow control devices, and any combination thereof configured to control the pressure in the porous storage reservoir and the overlying porous reservoir.

* * * * *